Jan. 26, 1937.                C. O. PRATT                 2,068,816
                        OIL SPRAY PURGE MECHANISM
                         Filed Dec. 9, 1931           2 Sheets-Sheet 1
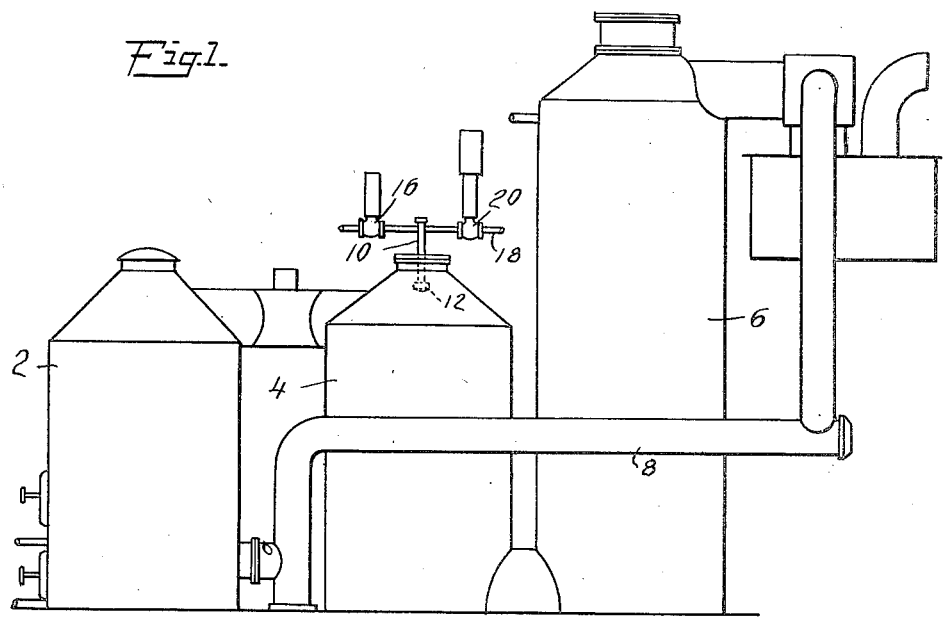
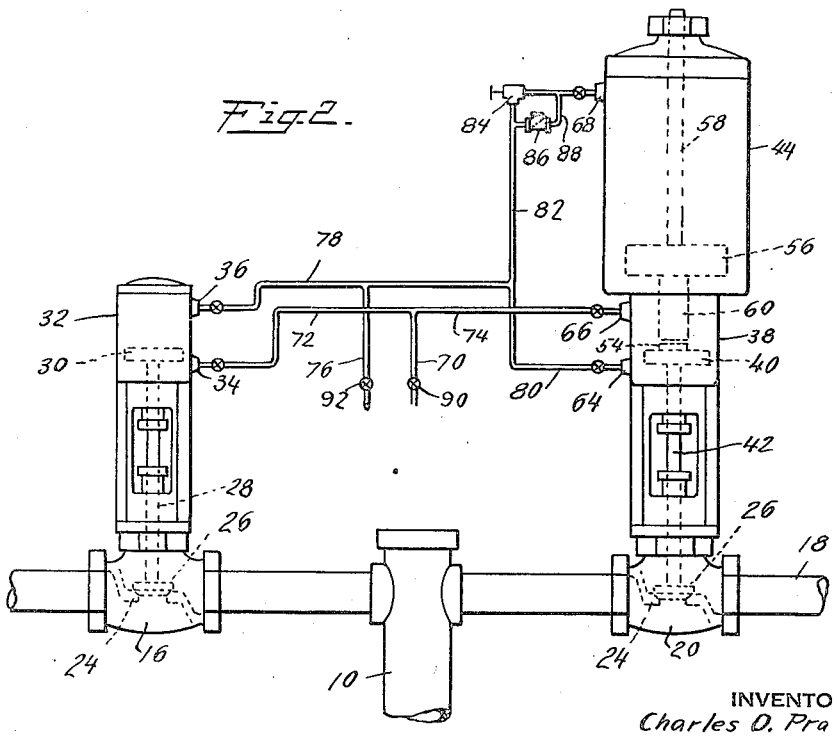
INVENTOR
Charles O. Pratt
BY
ATTORNEY

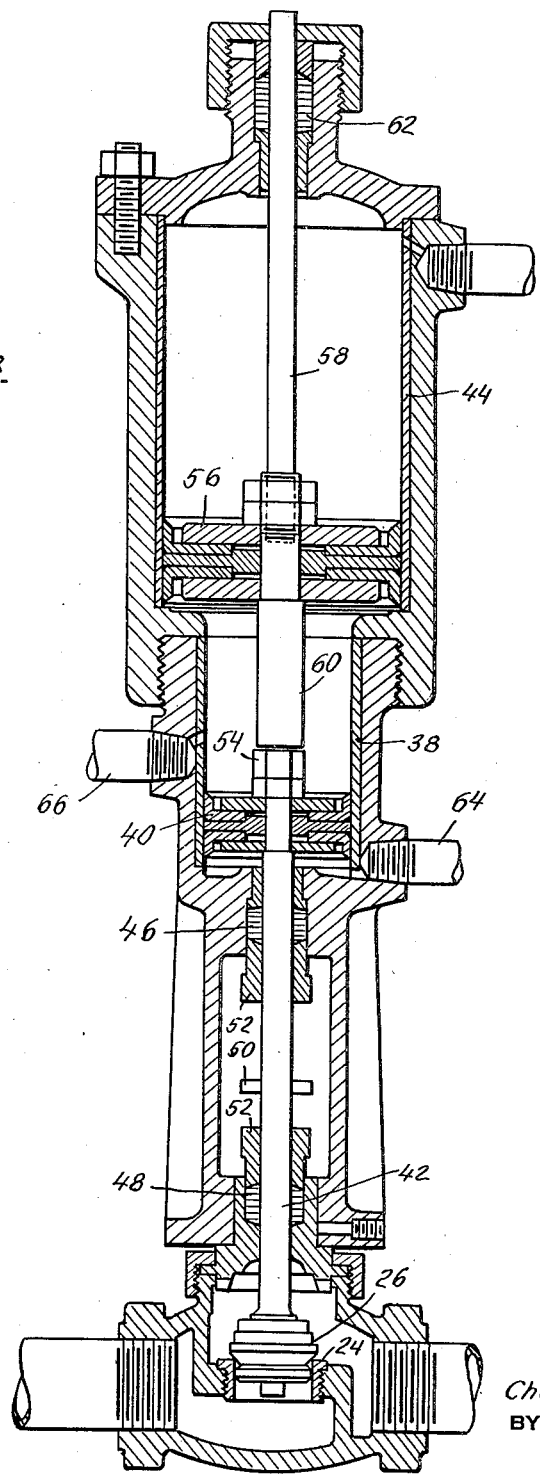

Patented Jan. 26, 1937

2,068,816

UNITED STATES PATENT OFFICE 2,068,816

OIL SPRAY PURGE MECHANISM

Charles O. Pratt, Maplewood, N. J., assignor to Semet-Solvay Engineering Corporation, New York, N. Y., a corporation of New York Application December 9, 1931, Serial No. 579,942

5 Claims. (Cl. 48—87)

My invention is directed to apparatus for purging oil supply pipes for carburetors used in carburetting water gas and the like to discharge oil remaining in said pipes into the carburetors after the flow of oil has been cut off. Apparatus embodying my invention may also be used for controlling the flow of other fluids through conduits and therefore, in its broader aspects, my invention is directed to mechanism for controlling the flow of fluid through conduits.

It is common practice in manufacturing water gas, to pass the gas through a carburetor heated to a high temperature and to spray oil into the carburetor to increase the amount of illuminating constituents in the gas. For this purpose an oil supply pipe is provided in the form of a conduit having a nozzle usually located in the top of the carburetor for atomizing the oil to reduce the same to a finely divided condition or fog capable of rapid and complete vaporization. The oil ordinarily is introduced during a portion only of the gas-making operation, for instance during the up-run cycle in a water-gas-making process. When the flow of oil is cut off, the oil conduit still contains undischarged oil in the portion thereof between the nozzle and the valve controlling the flow of oil. The end of the conduit carrying the spray nozzle extends into the carburetor and is therefore heated so that oil remaining therein tends to decompose or carbonize. The amount of oil thus heated varies with the construction of the apparatus and may amount to one-third to one-half gallon. When decomposed, the oil or decomposition products tend to clog the nozzle through which the oil is introduced into the carburetor interfering with the operation thereof. In order to overcome this difficulty it has been suggested that steam under a relatively low pressure, say one pound per square inch, be introduced into the oil conduit after the flow of oil is cut off to purge the oil conduit and discharge oil remaining therein into the carburetor. However, it has been found in practice, when using steam under such low pressure, the oil is not atomized in passing into the carburetor but drips from the nozzle in a stream or large drops. In order to atomize the oil remaining in the oil conduit in purging the same, I therefore use steam under high pressure, say about 120 pounds per square inch or more. However, when using steam under such high pressure, if the flow of steam is not properly controlled, there is danger of introducing so much steam into the carburetor that the temperature of the carburetor is lowered and the operation of the apparatus deleteriously affected.

In accordance with my invention valve operating mechanism is employed for automatically controlling the operation of the valve controlling the passage of steam into the oil conduit to open the steam valve and positively close the same a predetermined time interval after the valve has been opened. The period during which the steam valve is opened may be regulated as required to admit sufficient steam to purge the oil conduit without detrimental effect on the operation. In the preferred form of my invention, mechanism is provided for operating the steam valve in conjunction with the oil valve to admit steam to the oil conduit only when the oil valve is closed and to cut off the supply of steam when said conduit has been suitably purged.

Among the objects of my invention are to purge the oil conduit through which oil is introduced into the carburetor of gas producing apparatus, to utilize steam under high pressure in purging the oil inlet whereby oil discharged into the carburetor is atomized and rapid vaporization thereof takes place, and to provide mechanism for operating valves such as those used for controlling the introduction of steam into the carburetor of gas producing apparatus for purging the oil conduit. These and other objects and features of my invention will appear from the following description thereof in which reference is made to the accompanying figures of the drawings illustrating a preferred embodiment of my invention.

In the drawings:

Fig. 1 is a diagrammatic view of a water gas set embodying my invention in its preferred form;

Fig. 2 is an enlarged view of the oil and steam valves and control mechanism therefor; and Fig. 3 is a vertical sectional view through the operating mechanism for the steam valve.

The embodiment of my invention, illustrated in the figures of the drawings, is employed in combination with a back-run water gas set comprising a generator 2, a carburetor 4, a superheater 6, and a back-run conduit 8, all of which are illustrated conventionally and may be of any suitable construction. The carburetor 4 is provided with an oil inlet conduit 10 for introducing oil into the carburetor. A nozzle 12 for atomizing the oil is secured to the end of the conduit 10 and, as shown in Fig. 1, projects into the top of the carburetor above the checker brick to atomize the oil and distribute the same in the form of a fog of finely divided particles into the top of the carburetor. However, it will be apparent that the invention is applicable as well to carburetors in which the oil inlet conduit enters the side or other part of the carburetor for projecting oil into the same.

The oil inlet conduit 10 is provided with an oil valve 16 located outside of the carburetor for controlling the flow of oil through the conduit. A steam conduit 18 communicates with the oil conduit between the valve 16 and the carburetor and is provided with a steam valve 20 controlling the passage of steam from a suitable source of steam to the oil conduit 10.

As shown in Fig. 2 the valves 16 and 20 are globe valves each having a valve seat 24 and a valve closure 26 movable vertically into and out of engagement with the valve seat. In order to operate the oil valve 16 and steam valve 20 to effect the introduction of oil and the purging of the oil conduit without introducing sufficient steam into the carburetor to have a deleterious effect on the process, the valves 16 and 20 are operated automatically to cut off the oil supply and thereafter to open the steam valve and positively close the same after a predetermined interval of time has elapsed. The valve operating mechanism illustrated in Fig. 2 of the drawings is operated hydraulically or by any suitable fluid under pressure.

The operating means for the oil valve 16 is secured to the valve casing in fixed position and is provided with a vertically movable shaft 28 to which the valve closure 26 is secured. The shaft 28 is moved by a piston 30 in a cylinder 32 to which fluid under pressure is admitted through the inlet 34 below piston 30 and through inlet 36 above the piston, as hereinafter described. The operating mechanism for steam valve 20 is in part similar in construction to that for the oil valve 16 and comprises a cylinder 38, piston 40 and shaft 42, corresponding to elements 32, 30 and 28 for operating the oil valve. The cylinder 38, however, is open at its upper end and communicates with a larger cylinder 44 positioned above cylinder 38. The shaft 42 of the steam valve passes through packing 46 in the lower end of cylinder 38 and the packing 48 in the top of the valve 20. A pin 50, carried by the shaft 42, serves as an indicator to show the position of the valve, that is, whether the valve is open or closed. The upper end of the shaft 42 of the steam valve passes through the piston 40 and is provided with a headed member 54 positioned above the upper face of the piston 40.

The cylinder 44 communicates with the upper end of cylinder 38 and is provided with a piston 56. The cylinder 44 is of larger diameter than cylinder 38, and the piston 56 is of greater area than that of piston 40. Piston 56 is secured to a central shaft 58 extending above and below the piston and provided with a lower end 60 which is enlarged and extends below the piston 56 a sufficient distance to engage the member 54 on shaft 42 of piston 40 when both pistons are positioned adjacent the lower ends of their respective cylinders, i. e., at the lower end of the stroke of each piston. The upper end of the shaft 58 serves as a guide for the piston 56 and extends through packing gland 62 in the upper closed end of the cylinder 44. An inlet for the fluid, which actuates the piston 40 to raise the same and open the steam valve, is located at 64 below the piston 40. A similar inlet 66 is located in cylinder 38 above piston 40 and below the larger piston 56 and a third inlet 68 is located in cylinder 44 above piston 56.

The valve-operating mechanism is preferably actuated by hydraulic pressure and for this purpose a suitable source of liquid under pressure is provided with a pressure line 70 formed with a branch 72 leading to the inlet 34 below piston 30 of the oil valve operating mechanism and a separate branch 74 leading to the inlet 66 in cylinder 38 communicating with the space above piston 40 and below piston 56 of the steam valve operating mechanism. A separate pressure line 76 is provided with a branch 78 leading to the inlet 36 in cylinder 32 above the piston 30 and with branch lines 80 and 82 leading to the inlet 64 in cylinder 38 below piston 40 and to inlet 68 of cylinder 44 above the piston 56. A needle valve or other adjustable element 84 is positioned in the branch 82 of the pressure line communicating with the inlet 68 of cylinder 44 above the piston to regulate the flow of fluid into said cylinder whereby the period of time required for moving the piston 56 from the top to the bottom of the cylinder 44 is controllable at will. A check valve 86 is provided in a by-pass 88 about needle valve 84 to allow fluid to flow freely from the cylinder 44 when the piston 56 is raised. Valves 90 and 92 in the lines 70 and 76 respectively control the flow of liquid to the various cylinders and to a suitable drain to cause pressure to be applied first to one side of the pistons and then to the other as is well known in the operation of pistons under hydraulic pressure.

In operating the form of apparatus illustrated and described, the oil valve 16 and the steam valve 20 are normally closed. When it is desired to admit oil to the carburetor, for example, during the up-run cycle of a water gas making process, the valve 90 in hydraulic line 70 is opened so that fluid under pressure is admitted through the branch line 72 into the cylinder 32 below the piston 30, raising the piston and opening the oil valve 16. The valve 92 in line 76 is regulated to permit fluid above the piston 32 to pass through the lines 78 and 76 to a suitable drain. At the same time fluid under pressure passes through the branch line 74 into the cylinder 38 above the piston 40 holding the closure 26 of the valve 20 against the valve seat 24 and causing the piston 56 to be raised to the upper end of the cylinder 44. Fluid above the piston 56 passes to the drain through the by-pass 88, check valve 86, branch line 82 and line 76. The movement of the piston 56 upwardly carries the enlarged portion 60 of shaft 58 out of engagement with the member 54 on shaft 42 and thus renders the piston 40 operative to open the steam valve 20 when pressure is applied to the lower surface of the piston.

At the end of the carburetting period the flow of oil through the valve 16, oil inlet conduit 10 and nozzle 12 is cut off by regulating valves 90 and 92 to apply pressure to the fluid in line 76 and allow fluid to run to the drain through line 70. The piston 30 is thus forced downwardly, moving the shaft 28 and valve closure 26 of the oil valve 16 into contact with the valve seat 24, so that the flow of oil is thus cut off. At the same time fluid under pressure is passed through the branch line 80 to the inlet 64 below piston 40 and fluid allowed to drain from above the piston 40 through branch line 74. The piston 40 is thus raised moving the shaft 42 and valve closure 26 of the steam valve 20 upwardly to open the valve and admit steam under suitable high pressure, say 120 pounds to the square inch, to the oil inlet conduit 10 to discharge oil remaining in said conduit into the carburetor through the nozzle 12, and formed into a fog of very fine particles capable of being rapidly vaporized in the carburetor.

At the same time that fluid is applied through the branch line 80 to raise the piston 40 and open the steam valve, fluid is also applied under the same pressure through branch line 82 and needle valve 84 to the inlet 68 adjacent the top of cylinder 44 above the piston 56. The piston is thus forced downwardly at a rate dependent upon the adjustment of needle valve 84 whereby a predetermined time interval will elapse between the opening of the steam valve and the movement of the piston 56 downwardly to bring the enlarged lower end 60 of the shaft 58 into contact with the head 54 carried by the shaft 42. The area of piston 56 is greater than that of piston 40 so that a greater force is exerted upon the piston 56 to lower the same than is exerted upon the piston 40 to raise the piston even though the fluid is applied to each piston under the same pressure. Therefore, as fluid under pressure continues to pass into the cylinder 44, the piston 56 continues to move downwardly forcing the piston 40 downwardly against the action of fluid applied to the undersurface thereof so that the steam valve is closed a predetermined interval of time after said valve has been opened. When the steam valve 20 has been closed by movement of the valve closure 26 into engagement with the valve seat 24, the flow of steam into the oil inlet conduit 10 is cut off and the conduit purged or freed from oil so that the further introduction of oil through the conduit and nozzle is not impeded by the presence of carbon or the products of decomposition of the oil.

Although I have described my invention as applied to the carburetor of a water gas set, it will be apparent that the invention is applicable to the operation of valves applied to other types of apparatus and for controlling the flow of fluids other than steam and oil. Furthermore the apparatus may be used for purging conduits in other systems and other types of carburetors than that illustrated and described. My invention is also capable of numerous modifications and changes in the construction and operation of the elements of the apparatus without departing from the spirit and scope of the invention.

I claim:

1. In a carburetor of a water gas generating set, a conduit for introducing oil into said carburetor, a valve for controlling the flow of oil through said conduit, means for discharging oil remaining in said conduit into said carburetor after said oil valve is closed comprising a source of steam communicating with said conduit, a steam valve for controlling the flow of steam to said conduit, a piston associated with each of said valves for operating the same, means for simultaneously actuating said pistons to open said oil valve to admit oil to said carburetor and for rendering the piston controlling said steam valve operative, means for simultaneously actuating said pistons to close said oil valve and open said steam valve to admit steam to said conduit to discharge oil remaining therein into said carburetor, a piston movable into contact with the piston operating said steam valve to close said steam valve and render said piston inoperative, and means adjustable to allow a predetermined interval of time to elapse between the operation of the piston which opens said steam valve and the operation of the piston which closes said steam valve.

2. In a carburetor of a water gas generating set, a conduit for introducing oil into said carburetor, a valve for controlling flow of oil through said conduit, means for discharging oil remaining in said conduit into said carburetor after said oil valve is closed comprising a source of steam communicating with said conduit, a steam valve for controlling flow of steam to said conduit, a cylinder having a first-mentioned piston movable therein for operating said oil valve, a second cylinder having a second-mentioned piston movable therein for operating said steam valve and a third-mentioned piston movable in said second-mentioned cylinder to engage said second-mentioned piston, means for introducing pressure fluid into said cylinders to actuate said first- and third-mentioned pistons to simultaneously open said oil valve and move said third-mentioned piston to render the second-mentioned piston controlling the steam valve operative, means for introducing pressure fluid into said cylinders to actuate said first- and second-mentioned pistons to close said oil valve and open said steam valve, and means for moving said third-mentioned piston into contact with said second-mentioned piston to gradually close said steam valve.

3. In a carburetor of a water gas generating set, a conduit for introducing oil into said carburetor, a valve for controlling flow of oil through said conduit, means for discharging oil remaining in said conduit into said carburetor after said oil valve is closed comprising a source of steam communicating with said conduit, a steam valve for controlling flow of steam to said conduit, a pressure fluid-actuated cylinder having a first-mentioned piston therein for operating said oil valve, a second pressure fluid-actuated cylinder having a second-mentioned piston therein for operating said steam valve and an auxiliary piston arranged to contact with said second-mentioned piston, pressure fluid lines arranged to deliver pressure fluid to both of said cylinders, one line leading to said cylinders supplying pressure fluid to open said oil valve and move the auxiliary piston out of contact with the second mentioned piston, another of said pressure fluid lines leading into said cylinders supplying pressure fluid to close said oil valve and simultaneously move said second mentioned piston to open said steam valve, said other pressure fluid line being provided with a branch line for gradually supplying pressure fluid to said second cylinder to move said auxiliary piston into contact with said second mentioned piston thereby closing said steam valve, and a needle valve in said branch line for controlling flow of pressure fluid therethrough.

4. In a carburetor of a gas producing apparatus, a conduit for introducing oil into said carburetor, an oil valve in said conduit, means for opening and closing said oil valve to cause oil to flow intermittently into said carburetor, means for discharging into said carburetor oil remaining in said conduit after each closure of said oil valve comprising a source of steam communicating directly with said conduit, said source of steam being sufficiently large to purge said conduit of oil after a plurality of operations of said oil valve, a steam valve controlling the flow of steam to said conduit, means to open said steam valve, a separate member movable to close said steam valve, and means for operating said separate member to close said steam valve at the end of a predetermined interval of time after said valve has been opened.

5. In a carburetor of a gas producing apparatus, a conduit for introducing oil into said carburetor, an oil valve in said conduit for alternately opening and closing said conduit to cause intermittent flow of oil into said carburetor, a source of sufficient steam to purge from said conduit the oil remaining therein after a plurality of closures of said oil valve, said source of steam being directly connected to said conduit, a steam valve controlling flow of steam into said conduit, a fluid pressure operated device for operating said oil valve to open and close the same, a second fluid pressure operated device for operating said steam valve to open the same upon closure of said oil valve, a delayed action fluid pressure operated device for operating said steam valve to close the same at the end of a predetermined time interval and while said oil valve is still closed, and a source of fluid under pressure for operating each of said fluid pressure operated devices.

CHARLES O. PRATT.